United States Patent [19]
Hart et al.

[11] Patent Number: 5,395,074
[45] Date of Patent: Mar. 7, 1995

[54] RETROFIT BEZEL ASSEMBLY

[75] Inventors: Jack E. Hart, Bellevue; Gary B. Harwood, Roy, both of Wash.

[73] Assignee: Health Tecna Aerospace Company a unit of Ciba-Geigy, Ardsley, N.Y.

[21] Appl. No.: 28,783

[22] Filed: Mar. 10, 1993

[51] Int. Cl.⁶ .............................................. B64D 11/00
[52] U.S. Cl. ............................... 244/118.1; 244/118.5; 244/119
[58] Field of Search ............ 244/118.1, 118.5, 117 R, 244/119, 137.5, 137.2; 312/266, 269, 246, 247, 248, 272, 319.1; 105/321, 315; 5/9, 10 R

[56] References Cited

U.S. PATENT DOCUMENTS

| | | | |
|---|---|---|---|
| 3,102,607 | 9/1963 | Roberts | 244/118.5 |
| 4,490,883 | 1/1985 | Gauron | 16/245 |
| 4,799,631 | 1/1989 | Humphries et al. | 244/118.5 |
| 4,907,762 | 3/1990 | Bock et al. | 244/118.5 |
| 4,947,762 | 8/1990 | Perzl et al. | 105/329.1 |
| 5,108,048 | 4/1992 | Chang | 244/118.5 |
| 5,129,597 | 7/1992 | Manthey et al. | 244/118.5 |

FOREIGN PATENT DOCUMENTS

| | | | |
|---|---|---|---|
| 0279620A1 | 8/1988 | European Pat. Off. | B64D 11/00 |
| 0311771A1 | 4/1989 | European Pat. Off. | B61D 17/00 |

OTHER PUBLICATIONS

O'Love "Boeing, Propose New 727,707 Interior" Aviation Week Apr. 28, 1969, pp. 32–33.

Primary Examiner—Galen L. Barefoot
Attorney, Agent, or Firm—Christensen, O'Connor, Johnson & Kindness

[57] ABSTRACT

A retrofit bezel assembly to be installed within an interior of an aircraft, the aircraft having overhead stowage bins with shelves. The bezel assembly is constructed as a unit for installation in place of an existing bezel assembly. Each bezel assembly unit includes a ceiling panel, four bulkhead extensions, and two shelf extensions. The ceiling panel substantially spans and covers the upper surface of the interior of the aircraft from a right-side stowage bin to a left-side stowage bin. The bulkhead extensions are attached to the corners of the ceiling panel. They extend downwardly adjacent the interior ends of the sides of the stowage bins. The bulkhead extensions are configured to attach to inside ends of the bin shelves with fasteners through existing holes. Bin doors are attached to the bulkhead extensions. The door contour cross section matches the shape of the interior sides of the bulkhead extensions. Each of the shelf extensions is attached between two bulkhead extensions to be fastened to an interior end of a bin shelf. The shelf extensions extend the width of the bin shelves.

11 Claims, 6 Drawing Sheets

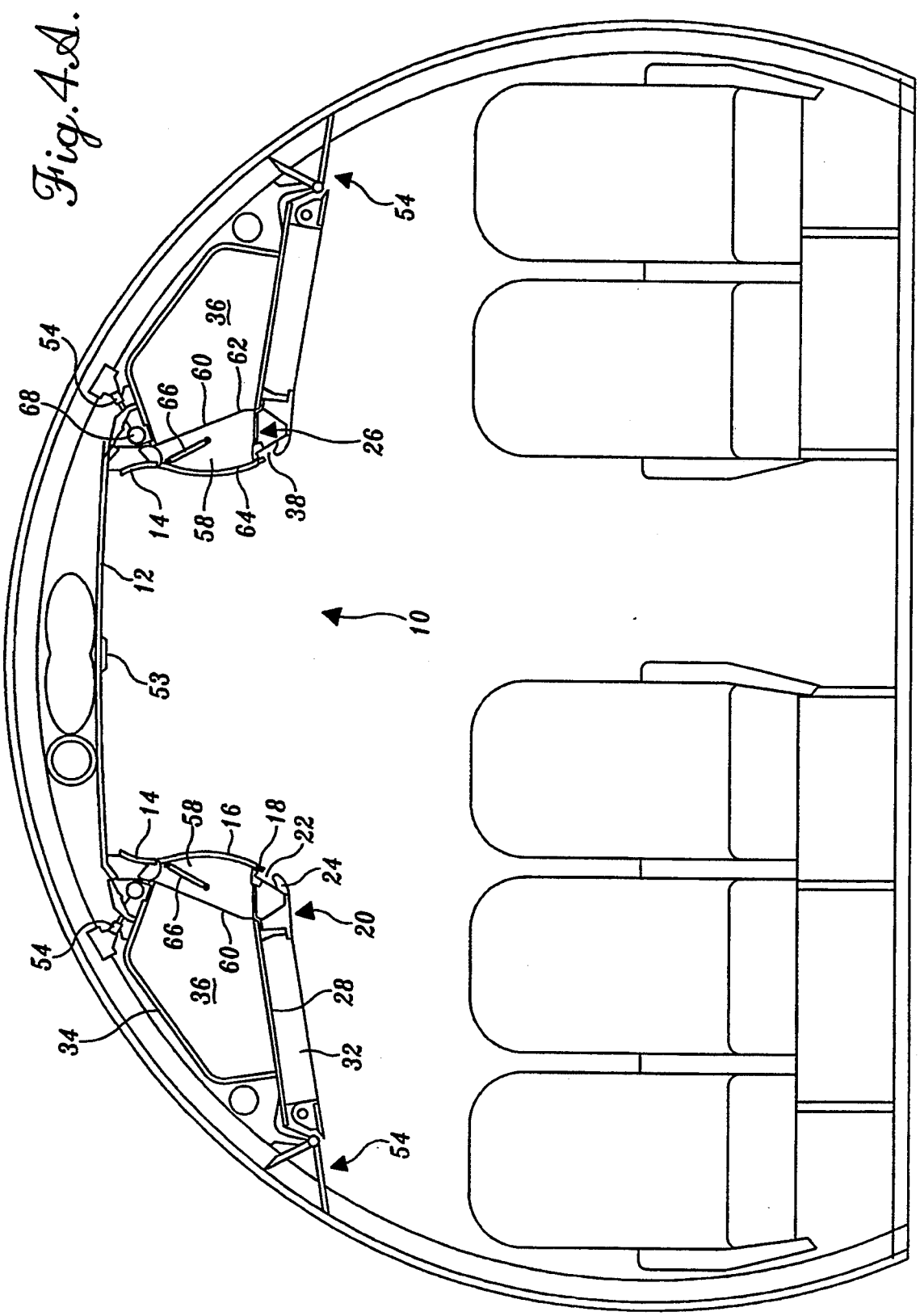

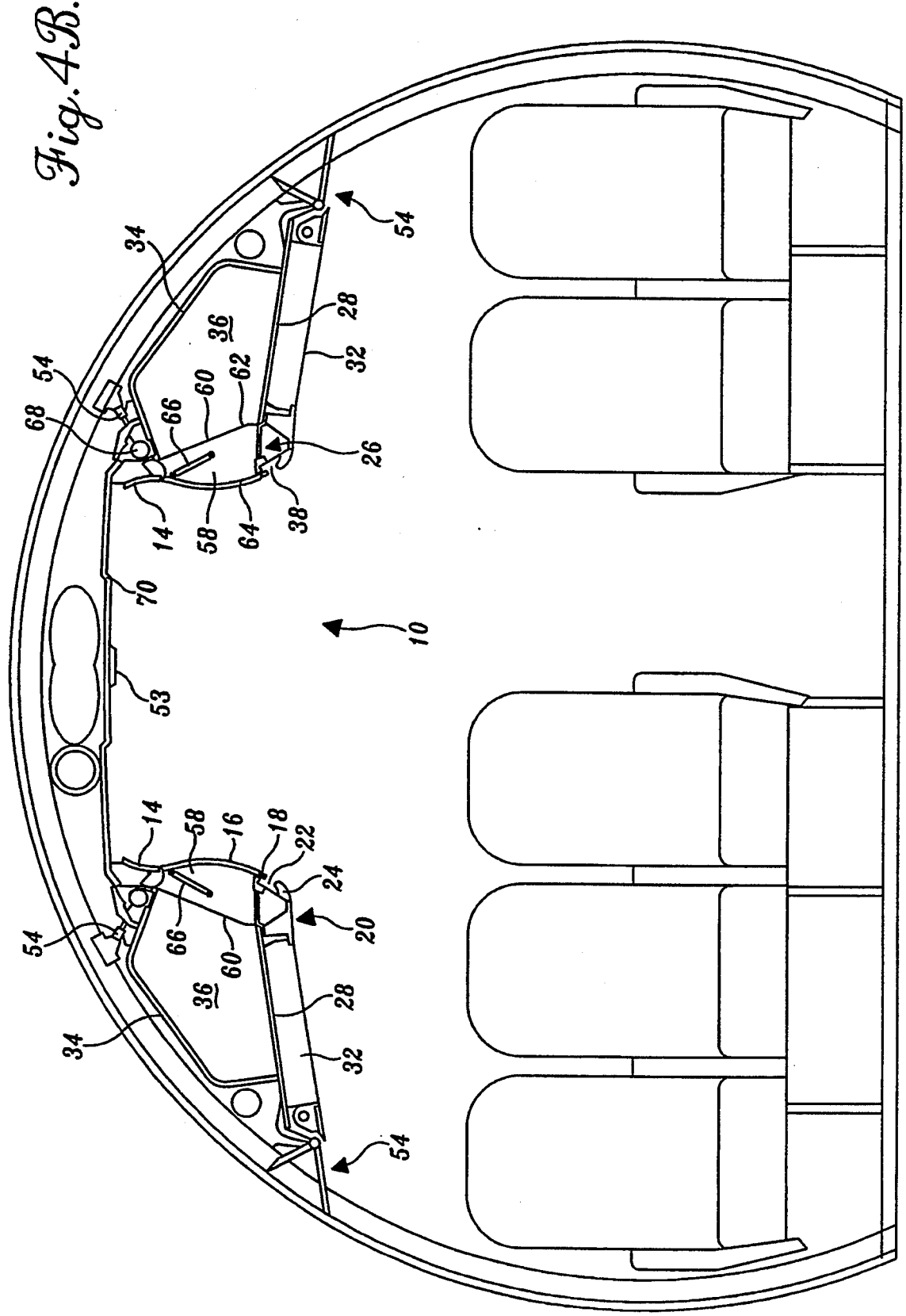

RETROFIT BEZEL ASSEMBLY

FIELD OF THE INVENTION

This invention relates generally to an apparatus and method for retrofitting aircraft interiors, and more particularly, to a retrofit bezel assembly to replace an existing bezel assembly within an aircraft.

BACKGROUND OF THE INVENTION

Newer commercial aircraft have interiors that are more modern, convenient, safe, and aesthetically pleasing than their older counterparts. For example, the overhead interior components of the newer aircraft have several advantages over the older interiors. The new stowage bins are larger to handle a larger volume of carry-on luggage. The new bin shelves are long and wide enough to fit a standard garment bag. The bins are also safer since the door has a more vertical orientation so that shifted baggage will not likely fall out upon opening the bin door. The entire overhead interior has a more modern look as well. For example, the ceiling panels provide a smooth uninterrupted ceiling to negate the "tunnel" appearance and create a wider looking passenger cabin.

Because of the expense of new planes, an airline cannot simply trade in its old models for new updated planes. However, the airline may not want to be left with the old looks, inconveniences, maintenance, and safety problems. Beyond real problems due to safety, an airline with outdated interiors may not instill confidence in its customers if they feel they are riding in a dilapidated airplane. Maintenance is also a problem for the airlines as the older aircraft require more work to keep them in good condition. In the past, the airlines have retrofit certain parts in an attempt to overcome these types of problems, at least to an extent.

Various portions of aircraft interiors have been replaced or retrofitted with new portions or improved parts. Examples of past interior retrofitting include old carpeting replaced with new and updated carpeting, worn seat fabric replaced with new seat coverings, the number and size of seats changed, changed seat arrangements and changed spacing between seats. Modifications to interior items above the seats has included replacing entire stowage bin assemblies. Changes may be desired due to wear, availability of new materials, safety concerns, or modern looks of newer planes.

Consumer confidence may not be maintained if interiors are old, worn out, outdated, or unsafe. However, modifications, even if only cosmetic, can be costly. An airline owning a large number of older aircraft may want their planes to look more like the newer aircraft. An airline may also have safety concerns. Concerns may also surface about the interchangeability of parts between its newer planes and the older models. To make the desired interior modifications may require extensive and expensive retrofitting. Replacing existing bins requires removal of the bin support structures in the walls of the fuselage, installing new bins and structure, rewiring and remounting of overhead lights, replacement of the passenger service units along with all their connections for electrical components and emergency and comfort air components, and ceiling panel replacement. The extensive work required is obviously quite expensive. Besides, all this work may require extensive down-time for the plane. This translates to costly losses in business.

No efficient method or replacement device has been devised or used in the past to update overhead bezel type interiors of aircraft while keeping costs low and aircraft downtime less than several days. Accordingly, the present invention was developed and provides significant advantages over previous devices or methods used to retrofit overhead interiors of aircraft.

SUMMARY OF THE INVENTION

The present invention provides an apparatus and method for modifying and improving an existing aircraft interior without modification to the existing baggage stowage bins, stowage bin structure, electrical systems, or lighting and passenger service units.

The present invention overcomes the disadvantages discussed above in several ways. A bezel for bezel replacement is disclosed with a new bezel assembly providing significant aircraft interior improvements. Through the replacement, a low cost aircraft refurbishment is accomplished. The new bezel assembly may be quickly installed, resulting in decreased aircraft downtime. The aesthetics of the aircraft are thus quickly updated to appear more modern. Added baggage capacity is also provided by the new bezel assembly due to an increase in bin volume with an extended shelf, curved doors, and increased throat height. Because of this additional baggage capacity, the new bezel assemblies are more convenient for passengers transferring from newer planes. Safety is also enhanced. The passengers in the inside seats are less exposed to baggage falling when a bin door is opened. Optional handrails also provide for increased safety. These and other advantages of the present invention will become apparent in the Detailed Description provided below.

In accordance with this invention, an interior bezel assembly to replace at least a portion of an existing aircraft bezel assembly is disclosed. The assembly includes at least one support member and at least one shelf extension. When installed in the aircraft interior, the support member extends between a ceiling panel and an inside end of a stowage bin shelf. The extension is configured to be able to attach to the inside end of an existing bin shelf. It also attaches to the support member.

In accordance with a particular preferred aspect of this invention, the assembly further includes a ceiling panel. The ceiling panel is attached to an upper end of the support member. The ceiling panel spans the area between a right-side stowage bin and a left-side stowage bin. Alternatively, the ceiling panel spans a smaller area depending on the interior configuration of the aircraft.

In accordance with another preferred aspect of this invention, the support members comprise at least one bulkhead extension disposed on each side of the ceiling panel such that at least one bulkhead extension can be attached to the right-side stowage bin shelf and at least one bulkhead extension can be attached to the left-side stowage bin shelf. The upper ends of each bulkhead extension are attached to the ceiling panel. Also in accordance with this aspect of the invention, bin shelf extensions are attached to the bulkhead extensions on each side, such that they are configured to be attached to the bin shelves on each side.

In accordance with another preferred aspect of this invention, bin doors are also attached to the bulkhead extensions on each side. The bin doors are configured to close with their bottom ends disposed near the inside end of the bin shelf extension.

In accordance with another preferred aspect of this invention, the shape of the bulkhead extensions are such that they match the shape of the space between the bin side walls and the doors, the bulkhead extensions being configured to be disposed adjacent to the bin side walls.

In accordance with another aspect of this invention, a handrail is also provided. The handrail is attached to the shelf extension.

In the preferred embodiment of this invention, the bulkhead extension and shelf extension have attachment holes that match preexisting holes on the bin shelves. This allows the entire replacement bezel assembly to be secured in place by fastening the assembly to the aircraft interior at the preexisting holes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 4A is a cross-sectional view of the aircraft interior illustrating the placement of the new bezel assembly of the present invention;

FIG. 4B is a cross-sectional view of a portion of the aircraft interior illustrating placement of an alternate embodiment of the new bezel assembly of the present invention.

DETAILED DESCRIPTION OF THE PREFERRED EMBODIMENT

Figure 1:
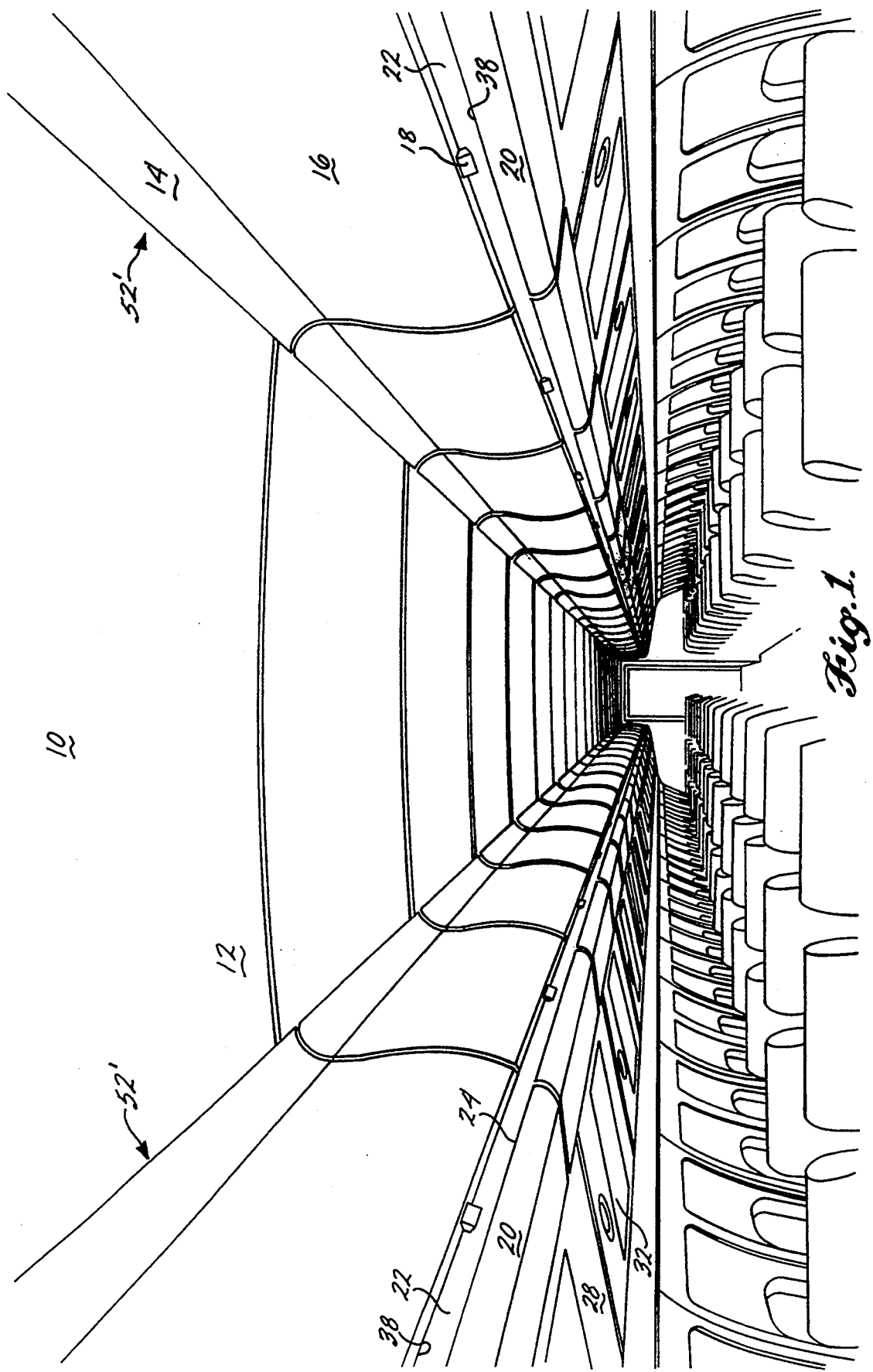
FIG. 1 is a perspective view of the interior of the aircraft after having been retrofit with the replacement bezel assembly of the present invention.

FIG. 1 illustrates the interior of an older aircraft after having been retrofit with a preferred embodiment of a bezel assembly 10 of the present invention. The elements (illustrated in FIGS. 4A, 4B, and 5) of each retrofit bezel assembly 10 that are shown in this figure include a ceiling panel 12, upper contour members 14, doors 16, door latches 18, and bullnoses 20. Bullnoses 20 include trim strips 22, handrails 24, and shelf extensions 26. Shelf extension 26 of each bullnose 20 is attached to the end of a shelf 28, an original bezel assembly 40 (illustrated in FIG. 2) having been removed.

Original passenger service units 32 and bins 34 including shelves 28 and bulkheads 36 are in place. An optional handrail 24 is preferably disposed at the inboard end of bullnose 20. A recess 38 within which to place a trim strip 22 and preferably seat row placards is disposed above handrail 24. In this preferred embodiment, recess 38 is actually integral with handrail 24 Door 16 is disposed above bullnose 20 and is opened by operating door latch 18. Door 16 has a nearly vertical orientation such that baggage within bin 34 is not likely to settle on door 16 or fall out upon opening door 16. Door 16 is pivotally connected at its upper end. An upper contour member 14 is disposed above door 16. Preferably, upper contour member 14 is formed in a gentle curving shape such that it smoothly continues the contour of door 16. Above upper contour member 14 ceiling panel 12 spans the length of upper contour member 14 and across to the opposite side of the airplane interior where another upper contour member 14 is disposed. Upper contour member 14 and ceiling panel 12 are not in direct contact. A light aperture 52' is maintained between the two to allow light to be projected onto ceiling panel 12.

The result of retrofit bezel assembly 10 being installed in the airplane is a newer look, easier cleaning, more convenient access, improved safety, increased shelf width, and increased stowage volume. These differences can be better appreciated when the original overhead interior is examined.

Figure 2:
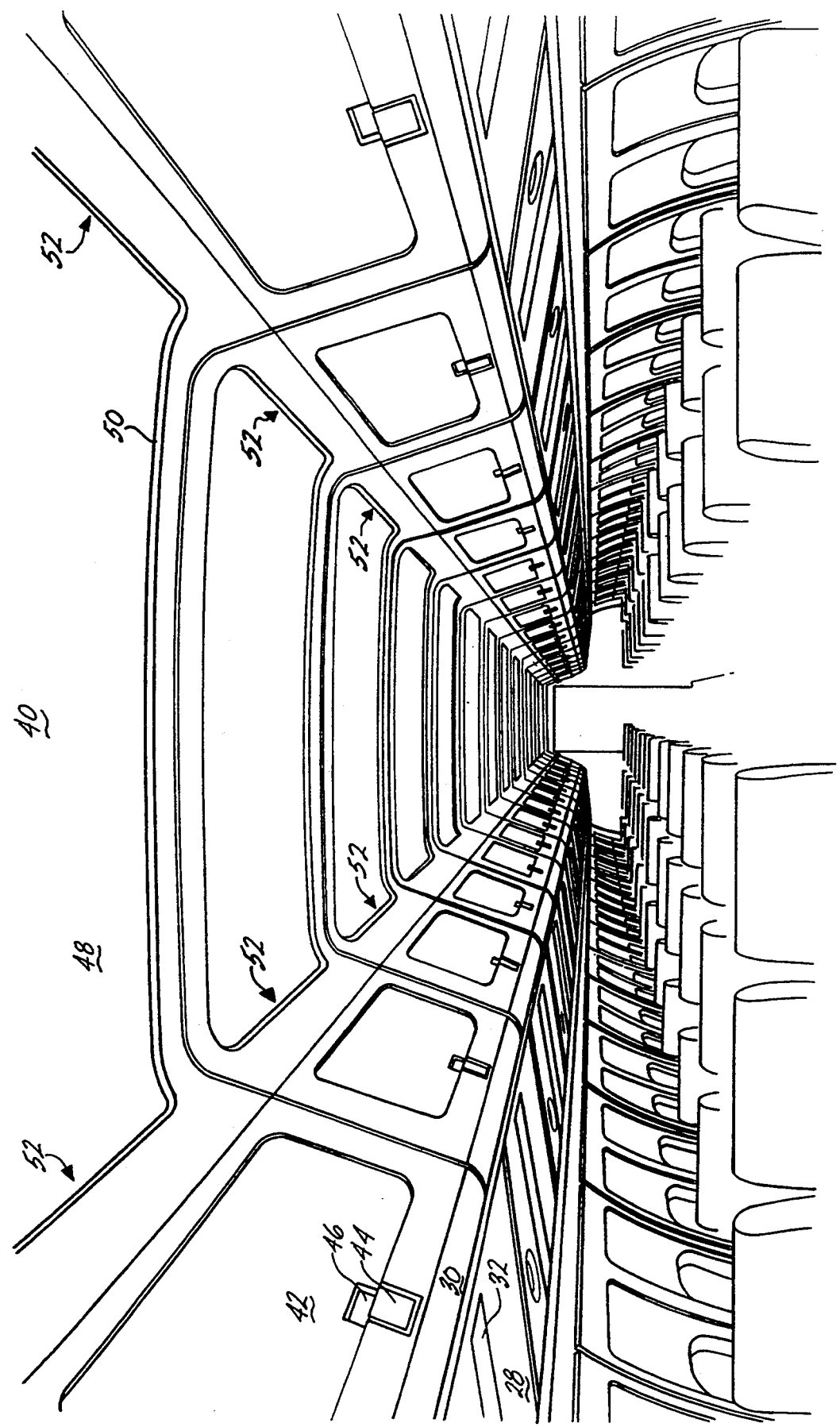
FIG. 2 is a perspective view of the interior of an aircraft without retrofitting of any overhead components.
Figure 3:
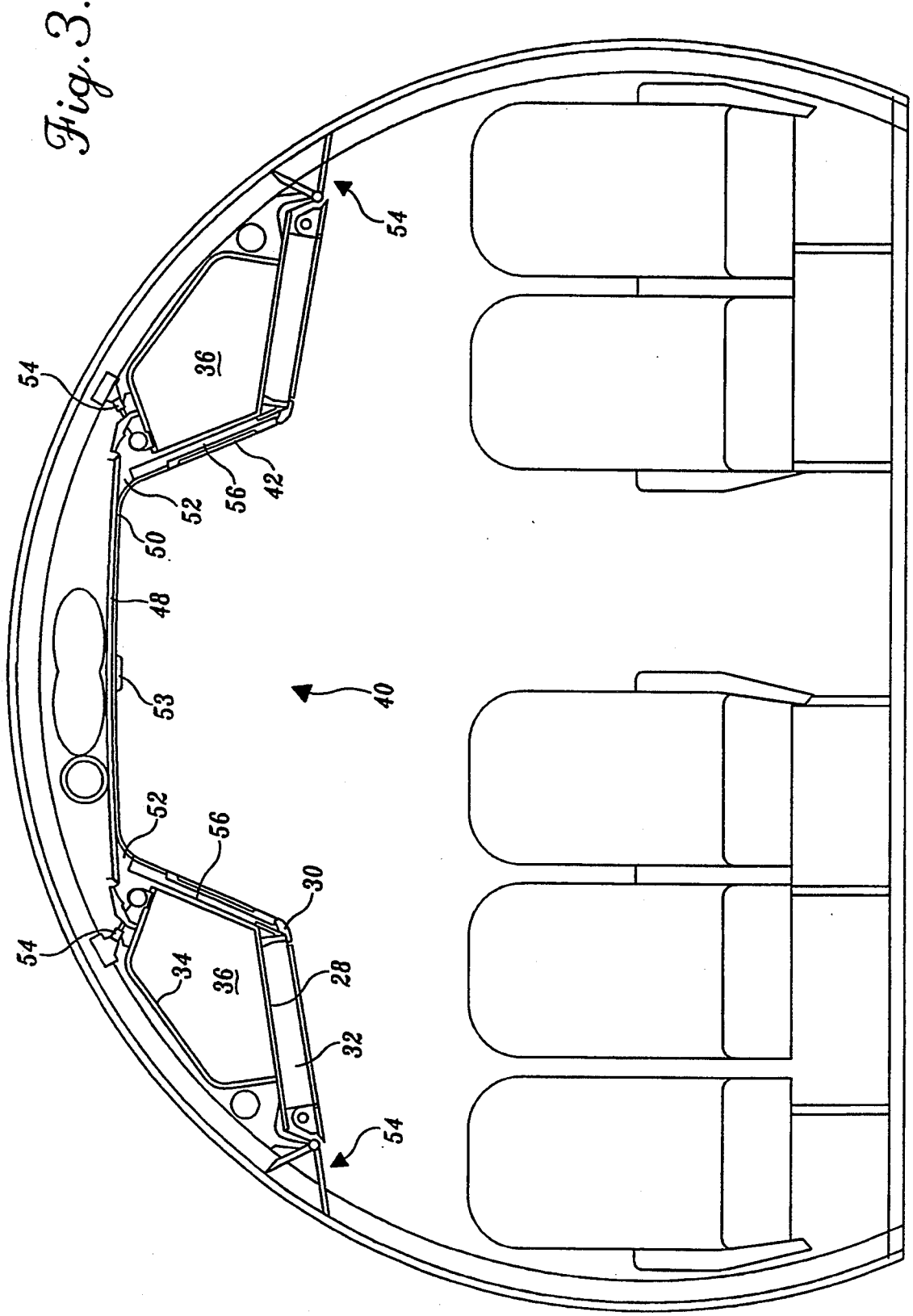
FIG. 3 is a cross-sectional view of an aircraft interior illustrating the original overhead components.

FIGS. 2 and 3 illustrate an overhead interior of an older airplane with an original bezel assembly 40 before being refurbished with retrofit bezel assembly 10 of the present invention. An original bullnose 30, which is a part of original bezel assembly 40, is attached to the end of shelf 28. This original bullnose 30 is simply a curved member that does not add to the width of shelf 28. Its function is to make a smooth transition to an original door 42 and cover structural and latch connections (shown in FIG. 3). An original door 42 is disposed above original bullnose 30 and includes an original door latch 44 within a door recess 46 in a lower, central area of original door 42. An original ceiling panel 48 spans across the area between original doors 42 on each side of the interior of the airplane. Original ceiling panel 48 includes a contoured panel 50 along its inner periphery. Light apertures 52 on the sides of contoured panel 50 allow light to be projected onto original ceiling panel 48.

Original doors 42 slope from top to bottom away from the center of the plane. Because of this slope, baggage items sometimes come to rest or are forced upon original doors 42. When original doors 42 are opened, these baggage items may fall out. It should also be evident that the stowage volume is not as large as that of modified bins 34 that have been refurbished with retrofit bezel assembly 10. These and other advantages of retrofit bezel assembly 10 will be discussed in detail below.

It should be noted at this point that the only change required to go from the arrangement illustrated in FIG. 2 to that illustrated in FIG. 1 is the removal of original bezel assemblies 40 and installation of retrofit bezel assemblies 10 of the present invention. Bins 34, passenger service units 32, and lights do not have to be moved, replaced, or modified. Therefore, the structural connections of bins 34 to the airplane fuselage does not have to be tampered with. The electrical components of the lighting and passenger service units 32 are not touched. The only electrical connections required are to emergency lights 53 that are installed along the airplane centerline in ceiling panel 12. The emergency air and passenger comfort air components (not shown) are also not tampered with. The refurbishment is simple and therefore quick. Not even drilling of any new holes is required.

FIG. 3 illustrates the arrangement of the original overhead interior in a cross-sectional view. Bin support structures 54 can be seen attached to the fuselage of the airplane. Passenger service units (PSU's) 32 are attached to PSU rails located on the underside of shelves 28. Bins 34 have bulkheads 36 disposed at their ends to separate one bin 34 from another. Support beams 56 secure original bullnose 30 to contoured panel 50 and this contoured panel supports original door 42 from its hinges, such that the complete typical original bezel assembly 40 comprises two original bullnoses 30, two original doors 42, four support beams 56, one contoured panel 50, and one original ceiling panel 48.

The only elements that must be removed in order to update the aircraft by retrofitting the overhead interior with retrofit bezel assembly 10 are original bezel assemblies 40. In the preferred practice of the invention, this is performed by simply removing the fasteners securing original bullnoses 30 of original bezel assemblies 40 to shelves 28. Alter these fasteners are removed, entire original bezel assembly 40 can be carried away. The overhead interior is then ready to be updated and improved with retrofit bezel assembly 10.

Figure 5:
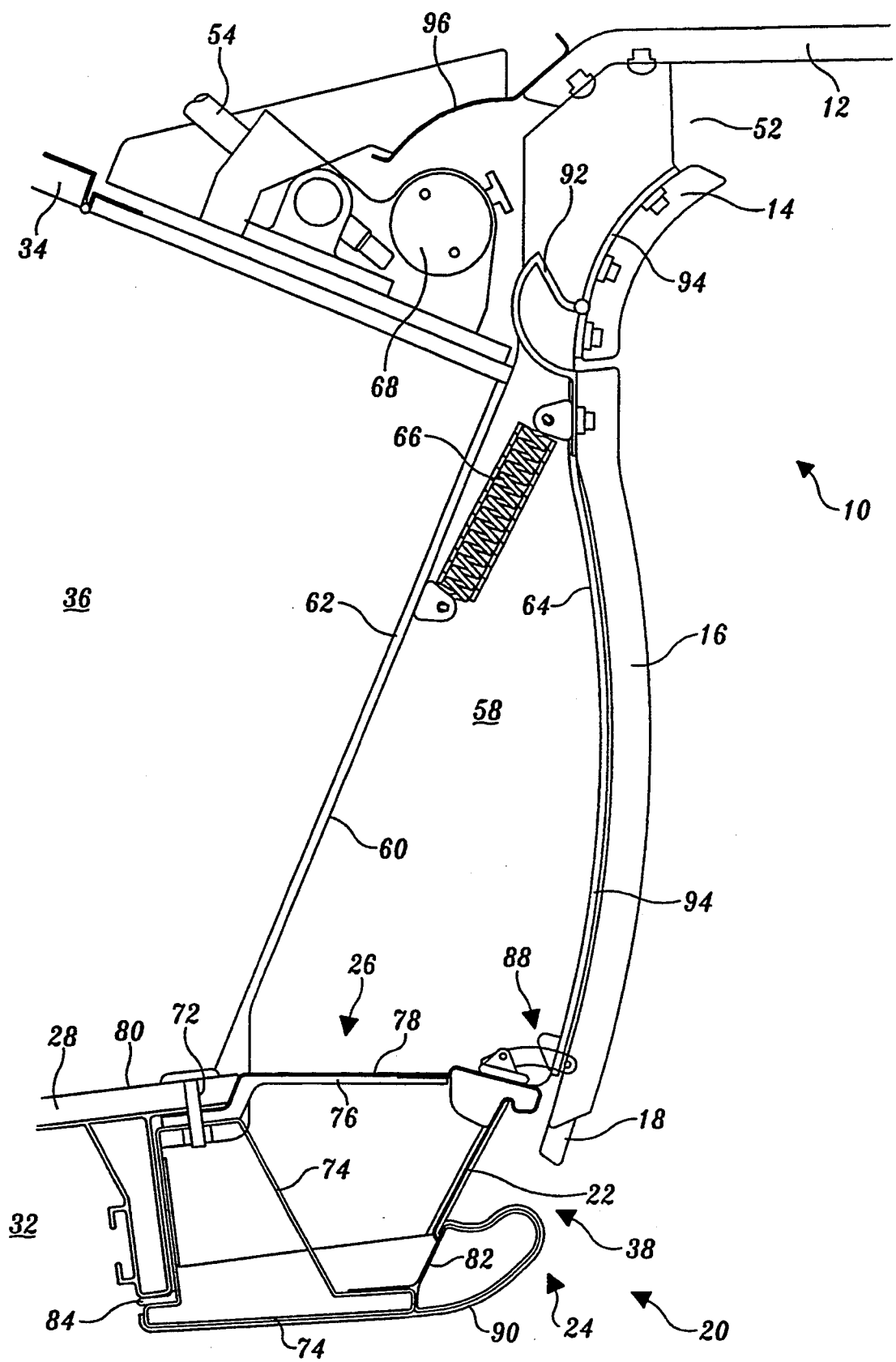
FIG. 5 is a detailed cross-sectional view of a portion of the new bezel assembly of the present invention.

FIGS. 4A and 5 illustrate the placement of retrofit bezel assembly 10 within the airplane in place of original bezel assembly 40. The major components of retrofit bezel assembly 10 are shown. Bullnose 20 is comprised of shelf extension 26 and handrail 24. Shelf extension 26 is attached to the inside end of shelf 28. In the preferred embodiment the same holes are used to secure shelf extension 26 as were used to secure original bezel assembly 40. Attached to shelf extensions 26 are bulkhead extensions 58. Bulkhead extension 58 has an outer edge 60 that generally matches the shape of an inner edge 62 of bulkhead 36 and an extension inner edge 64 generally matching the shape of door 16. Bulkhead extension 58 extends from shelf extension 26 up to ceiling panel 12. A door opening device 66 is attached between bulkhead extension 58 and door 16 to bias door 16 in an open position. Upper contour member 14 is attached to bulkhead extension 58 just above door 16 and it also supports the door hinges. Ceiling panel 12 is attached to the upper end of bulkhead extension 58 with light aperture 52' provided between ceiling panel 12 and upper contour member 14 for light to shine through onto ceiling panel 12 from existing ceiling light 68.

In the preferred embodiment of the invention, entire retrofit bezel assembly 10 with two bullnoses 20, two bulkhead extensions 58, two doors 16, two upper contour members 14, and a ceiling panel 12, as shown in FIG. 4A, is preassembled as a unit before installation within the aircraft interior. Once original bezel assembly 40 is removed, the entire unit is positioned in place of the original and secured in place with fasteners in preexisting holes at the end of shelves 28. Additional units are secured in place in the same manner until all original bezel assemblies 40 have been replaced. In this manner, the plane is quickly and inexpensively retrofit with an updated, improved interior.

FIG. 4B illustrates an alternate embodiment of retrofit bezel assembly 10. In this embodiment, instead of ceiling panel 12, contoured ceiling panel 70 is in place. This embodiment more closely matches the interior of a newer aircraft. It should be understood that several such alternatives will be apparent to those skilled in the art. Aesthetic changes in retrofit bezel assembly 10 can be made depending on the desired outward appearance of the overhead interior.

FIG. 5 shows details of one corner of retrofit bezel assembly 10. A cross-sectional side view at any of the four corners of retrofit bezel assembly 10 would show this same basic construction.

The basic building block of retrofit bezel assembly 10 is bulkhead extension 58. Bulkhead extension 58 is secured via bullnose 20 to shelf 28 through preexisting bullnose holes 72 that secured original bezel assemblies 40 (shown in FIG. 3). Above shelf 28, outer edge 60 of bulkhead extension 58 matches the shape of inner edge 62 of bulkhead 36. Extension inner edge 64 of bulkhead extension 58 has a shape to match the cross-sectional contoured shape of door 16 and upper contour member 14. All other components of retrofit bezel assembly 10 are coupled to bulkhead extension 58. In one alternate embodiment, bulkhead extension 58 is simply a support member and does not fill the gap between door 16 and bulkhead 36.

Bullnose 20 is attached to a lower portion of bulkhead extension 58 by fasteners through flanged portions of bulkhead extension 58. In the preferred embodiment, bullnose 20 includes five components. A base extrusion 74 is attached to a bezel attach bracket 76. Bezel attach bracket 76 and a shelf extension sheet 78 are attached to shelf 28 together with base extrusion 74. Shelf extension sheet 78 is joggled and extends from the underside of shelf 28 and form a continuation of a top surface 80 for shelf extension 26. A handrail and trim strip extrusion 82 is attached on one end to shelf extension sheet 78 and on the other end to base extrusion 74. Handrail and trim strip extrusion 82 is also attached to bulkhead extension 58. Finally, a foam strip 84 is disposed between a portion of base extrusion 74 and an existing lower edge of a PSU inboard support to absorb vibrations and make up for any freeplay in the assembly. Each of these components extends the length of bezel assembly 10 between two bulkhead extensions 58 on each side of the aircraft.

Handrail and trim strip extrusion 82 includes a trim strip recess 38 formed within its outward face just above handrail 24. Trim strip recess 38 is for use in holding trim strip 22 with seat designations. Above trim strip recess 38, on a center portion of handrail and trim strip extrusion 82, a latch striker 88 is attached. Latch striker 88, together with the door-mounted latch 18, is a conventional door-latching mechanism such as is found on newer aircraft to retain door 16 in a closed position. Handrail 24 and a lower face of base extrusion 74 are preferably covered with a decorative covering 90.

Door 16 is attached to upper contour member 14 with hinges 92 at its upper end. Door 16 has a contoured cross-sectional shape with a concave surface facing the inside of bin 34 for desired aesthetic appearance and to hold more baggage. The bottom end of door 16 has a latch 18 attached to it which interfaces with the door latch striker 88 to secure the door in a closed position. Hinge 92 is a conventional "goose neck" shaped hinge with a semi-circular, cross-sectional shape that allows door 16 to be raised entirely above the opening of bin 34. Door opening device 66 is attached between bulkhead extension 58 and an upper portion of door 16 to raise and bias door 16 in an open position following door latch 18 disengagement. Door opening device 66 is preferably a cylindrical helical spring and dampener device in a linear arrangement. Door opening device 66 is attached to the inside face of door 16 at its upper end and is attached to bulkhead extension 58 near outer edge 60. Alternatively, door opening device 66 is a coil spring attached between bulkhead extension 58 and hinge 92. Other biasing means are also possible.

Bezel assemblies 10 are installed end-to-end in the aircraft. A gap cover 94 is secured to extension inner edges 64 of bulkhead extensions 58 to cover adjacent extension inner edges 64 and any gap between them. Gap cover 94 is preferably made of a semi-rigid decorative material. Gap cover 94 is disposed between bulkhead extensions 58 and upper contour members 14 and doors 16. Similar gap covers are installed between adjacent edges of bullnose 20.

The top end of bulkhead extension 58 is attached to ceiling panel 12. Bulkhead extension 58 maintains light apertures 52' between upper contour member 14 and ceiling panel 12 to allow light to project through from existing ceiling light 68. An existing reflector 96 is disposed above existing ceiling light 68. When retrofit bezel assembly 10 is installed in place, ceiling panel 12 is retained sidewards by interface pressure between the outboard edges of ceiling panel 12 and the inboard edges of existing light reflector 96.

As discussed above, although one portion of retrofit bezel assembly 10 has been described in detail, the three other corners of the same assembly have the same construction. Retrofit bezel assembly 10 is preferably constructed as a modular unit to be quickly and easily installed in the overhead interior of an aircraft.

The advantages of retrofit bezel assembly 10 of the present invention are numerous. The cost savings alone is substantial. Retrofitting a plane in accordance with this invention salvages entirely existing bin 34 installation together with its structure, general cabin electrical lighting, and PSU installation. No changes are required to existing bin 34 installation such as bin support structures 54, passenger service units 32, and general cabin lighting electrical components. It is strictly a bezel for bezel replacement. New bezel assembly 10 having significant improvements. Thus, a low cost airplane refurbishment is accomplished.

The design of new bezel assembly 10 also provides significant cost savings due to quick installation. Since this modification only requires replacing original bezel assemblies 40, it can be accomplished in one shift, essentially overnight. An entire overhead interior of an aircraft can be updated in an estimated 31 man hours (four trim and finish mechanics, plus one electrician for one shift). Full airplane interior refurbishments require 1200 man-hours or more. Significant cost savings are realized not only in workers' time, but also in decreased aircraft downtime.

The aesthetics of the aircraft interior are quickly updated through use of the present invention. Older aircraft can be made to look more modern. For example, the interior illustrated in FIG. 1 shows how retrofitting an older aircraft provides an interior appearance similar to that in a newer aircraft. New bezel assemblies 10 have door and ceiling aesthetics that are similar. A smooth uninterrupted ceiling negates the "tunnel" appearance and creates a wider looking passenger cabin as well.

Low-cost maintenance is also an advantage inherent in this new bezel assembly 10. New bezel assemblies 10 contain new doors 16, ceiling panels 12 and bullnoses 20 that are the main visible surfaces to the passengers. All surfaces are decorative covered. There are no door sculptures or perforated ceilings as in many existing interiors. This feature makes it easier to clean. The all new components reduce overall airplane maintenance requirements.

The modular design of bezel assembly 10 of the present invention is also advantageous. Each new bezel assembly 10 is complete with bullnose 20, doors 16, and ceiling panel 12 designed and manufactured as a modular unit, fully interchangeable with the existing original bezel assemblies 40. No special installation tooling is required.

The added baggage capacity provides additional convenience to the passengers. Since more baggage stowage volume is available, less loading confusion and frustration results. The volume of a bin is increased 10% per door (was 4.5 cu. ft., now 5.0 cu. ft.). Shelf 28 width increase allows a typical garment bag to be easily placed within bin 34 (was 16 inches, now 20.3 inches in the preferred embodiment). The design of the present invention also provides an increased door open "throat height." In the preferred embodiment 1.2 inches are added to the narrowest area through which baggage must pass.

Because the new bezel assemblies 10 are larger, they are also more convenient for passengers transferring from newer planes. For example, if a passenger is transferring from an MD80 to a DC-9 they will find that the bins have the same baggage stowage features. In the preferred embodiment, partly because the weight of bezel assembly 10 is lower than that of original bezel assembly 40, the baggage weight capacity per door can be increased.

The increase in bin volume also reduces the length requirement for bin-mounted life rafts. The old smaller bins required 46 inches, while the new bezel assembly 10 of the preferred embodiment only requires 38 inches to stow a life raft. New ceiling panels 12 have no affect on existing ceiling-mounted life raft compartments.

Safety is also enhanced. The passengers in the inside seats are less exposed to baggage falling on their heads when a bin door 16 is opened. The increased shelf 28 width, as well as the more vertically oriented doors 16 help rectify this problem with older interiors. Optional handrails 24 provided on bullnose 20 also provide for passenger and cabin attendant safety.

While the preferred embodiment of the invention has been illustrated and described, it will be appreciated that various changes can be made therein without departing from the spirit and scope of the invention. Changes may be made, for example, in the contours of the components so that they match the design of other aircraft interiors or to suit individual airline requirements Also a variety of bezel configurations would be required to suit specific airplane configurations. Length, width, and component quantities per bezel are variables. However, the basic configurations of the individual components would be as described herein. Although in the preferred embodiment of the invention retrofit bezel assembly 10 is installed as a single unit, it could be installed as separate units. For example ceiling panel 12 could be separate from the components on either side to be fastened together once positioned in the airplane interior.

The embodiments of the invention in which an exclusive property or privilege is claimed are defined as follows:

1. An apparatus to replace at least a portion of an interior bezel assembly of an aircraft having stowage bins with shelves, comprising:

(a) a first support member for attachment to a bin shelf;

(b) a first bin shelf extension attached to the first support member, the first support member extending upwardly from the first bin shelf extension, the first bin shelf extension having a top surface oriented generally horizontally and adapted to abut and extend inwardly front the end of the existing bin shelf; and (c) attachment means for securing the first bin shelf extension to the inward end of the existing bin shelf such that the first bin shelf extension extends the usable shelf width.

2. The apparatus of claim 1, wherein the aircraft has right-side stowage bins and left-side stowage bins, the apparatus further comprising a second support member for attachment to a bin shelf and a ceiling panel attached to an upper end of the first support member and an upper end of the second support member, said ceiling panel adapted for spanning the area between a right-side stowage bin and a left-side stowage bin.

3. The apparatus of claim 2, further comprising a second bin shelf extension and wherein the first and second support members comprise first and second bulkhead extensions, the first bulkhead extension being attached to the first bin shelf extension and the second bulkhead extension being attached to the second bin shelf extension, the bulkhead extensions having upper ends attached to the ceiling panel, and wherein the attachment means includes means for securing the first bin shelf extension to the right-side bin shelf and the second bin shelf extension to the left-side bin shelf.

4. The apparatus of claim 3, wherein the stowage bins include side walls, the apparatus further comprising a plurality of bin doors, each door being attached to at least one of said bulkhead extensions, wherein at least one of said bulkhead extensions is coupled to a bin shelf adjacent to one of the side walls of the stowage bins, said at least one bulkhead extension having a shape substantially matching the shape of the space between the stowage bin side wall and the bin door.

5. The apparatus of claim 1, further comprising a bin door attached to the first support member, said door constructed and arranged to close with its bottom end disposed near an inner edge of the bin shelf extension.

6. The apparatus of claim 1, further comprising a handrail attached to the bin shelf extension.

7. The apparatus of claim 1, wherein the stowage bin shelves include bullnose holes, wherein the attachment means include attachment holes in the first support member and first bin shelf extension that are adapted to match the preexisting bullnose holes in the bin shelves, such that the entire bezel assembly can be secured in place by fastening the assembly to the aircraft at the preexisting bullnose holes.

8. A method of updating an aircraft interior with interior replacement bezel assembly units, the aircraft interior including bins and bin shelves and an old bezel assembly having an old ceiling panel, an old bullnose assembly, and an old door, each replacement unit including a ceiling panel, bulkhead extensions, bin doors, and shelf extensions, comprising the steps of:

(a) removing the old bezel assembly including the old ceiling panel, the old stowage bin doors, and the old bullnose assembly, leaving old bins and bin shelves in place;

(b) positioning an entire replacement bezel assembly unit in place within the aircraft in place of the old bezel assembly;

(c) fastening the unit in place; and (d) attaching said shelf extension to the inside end of the bin shelves to extend the width of the bin shelves.

9. The method of claim 8, wherein the step of positioning is carried out such that pre-existing bullnose holes in the bin shelves are aligned with attachment locations on the replacement unit.

10. The method of claim 8, wherein the unit is completely pre-assembled before positioning and fastening it within the aircraft.

11. A preassembled retrofit bezel assembly to be installed within an interior of an aircraft having stowage bins with shelves, the assembly comprising:

(a) a ceiling panel to substantially span and cover the upper surface of the interior of the airplane from a right-side stowage bin to a left-side stowage bin;

(b) a plurality of bulkhead extensions attached to the sides of the ceiling panel to extend downwardly along portions of the front of the stowage bins and to be attached to inside ends of the bin shelves; and (c) a plurality of shelf extensions each attached to at least one bulkhead extension, the shelf extensions including means for attachment to the inside ends of the bin shelves to extend the width of the bin shelves, the shelf extensions having upper surfaces oriented generally transverse to the bulkhead extensions.

* * * * *

UNITED STATES PATENT AND TRADEMARK OFFICE
CERTIFICATE OF CORRECTION

PATENT NO. : 5,395,074
DATED : March 7, 1995
INVENTOR(S) : J.E. Hart et al.

It is certified that error appears in the above-indentified patent and that said Letters Patent is hereby corrected as shown below:

| COLUMN | LINE | |
|--------|------|---|
| 5 | 13 | "Alter" should read --After-- |

Signed and Sealed this

Eighth Day of August, 1995

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,395,074
DATED : March 7, 1995
INVENTOR(S) : J.E. Hart et al.

It is certified that error appears in the above-indentified patent and that said Letters Patent is hereby corrected as shown below:

Title page, [73]    "Health" should read --Heath--
  Column 1    Assignee

Signed and Sealed this

Twentieth Day of February, 1996

Attest:

BRUCE LEHMAN

*Attesting Officer*    *Commissioner of Patents and Trademarks*